United States Patent [19]
Monta et al.

[11] Patent Number: 5,828,358
[45] Date of Patent: Oct. 27, 1998

[54] WAVEFORM DISPLAY SIGNAL GENERATING APPARATUS

[75] Inventors: Hiroki Monta, Takatsuki; Masahito Yamaoka, Ibaraki, both of Japan

[73] Assignee: Matsushita Electric Industrial Co., Ltd., Osaka, Japan

[21] Appl. No.: 631,835

[22] Filed: Apr. 10, 1996

[30]     Foreign Application Priority Data

Apr. 10, 1995  [JP]  Japan .................................. 7-083877

[51] Int. Cl.⁶ ........................................................ G09G 5/34
[52] U.S. Cl. ........................................... 345/133; 345/24
[58] Field of Search ............................... 345/23–24, 133, 345/134, 115–116

[56]           References Cited

U.S. PATENT DOCUMENTS

| | | | |
|---|---|---|---|
| 4,394,650 | 7/1983 | Long et al. ................................ | 345/23 |
| 4,591,897 | 5/1986 | Edelson .................................... | 345/133 |
| 5,027,212 | 6/1991 | Marlton et al. .......................... | 345/133 |
| 5,172,216 | 12/1992 | Suzuki et al. ........................... | 348/185 |
| 5,559,530 | 9/1996 | Yamashita et al. ...................... | 345/23 |

FOREIGN PATENT DOCUMENTS

| | | |
|---|---|---|
| 679 037 | 10/1995 | European Pat. Off. . |
| 1-017579 | 1/1989 | Japan . |
| 4-305161 | 10/1992 | Japan . |
| 5-028230 | 2/1993 | Japan . |
| 7-128372 | 5/1995 | Japan . |

OTHER PUBLICATIONS

Search report for International Appln. No. EP 96302344 dated Feb. 3, 1998.

*Primary Examiner*—Richard A. Hjerpe
*Assistant Examiner*—Tracy H. Nguyen
*Attorney, Agent, or Firm*—Ratner & Prestia

[57]           ABSTRACT

A waveform display signal generating apparatus is provided in which a result of calculation processing of digital data in a CPU is visualized and is converted into a television video signal for display on a screen of a television receiver under production. The apparatus verifies digital data processing on a screen of a television receiver under production and provides a simplified verification system. A signal digitized at an A/D converter is digitally signal processed at a data processing circuit. The data under digital signal processing is supplied to a CPU through a CPU interface circuit, is calculated for converting into a graph and then the converted data is stored in a RAM in a form of a bit map data. The bit map data is converted into an analog signal at a D/A converter, is further converted into a television video signal at a television encoder and then is supplied from a video signal output terminal to a video circuit of a television receiver under production. Thus, a graph calculated at the CPU is displayed on the screen of the television receiver.

7 Claims, 7 Drawing Sheets

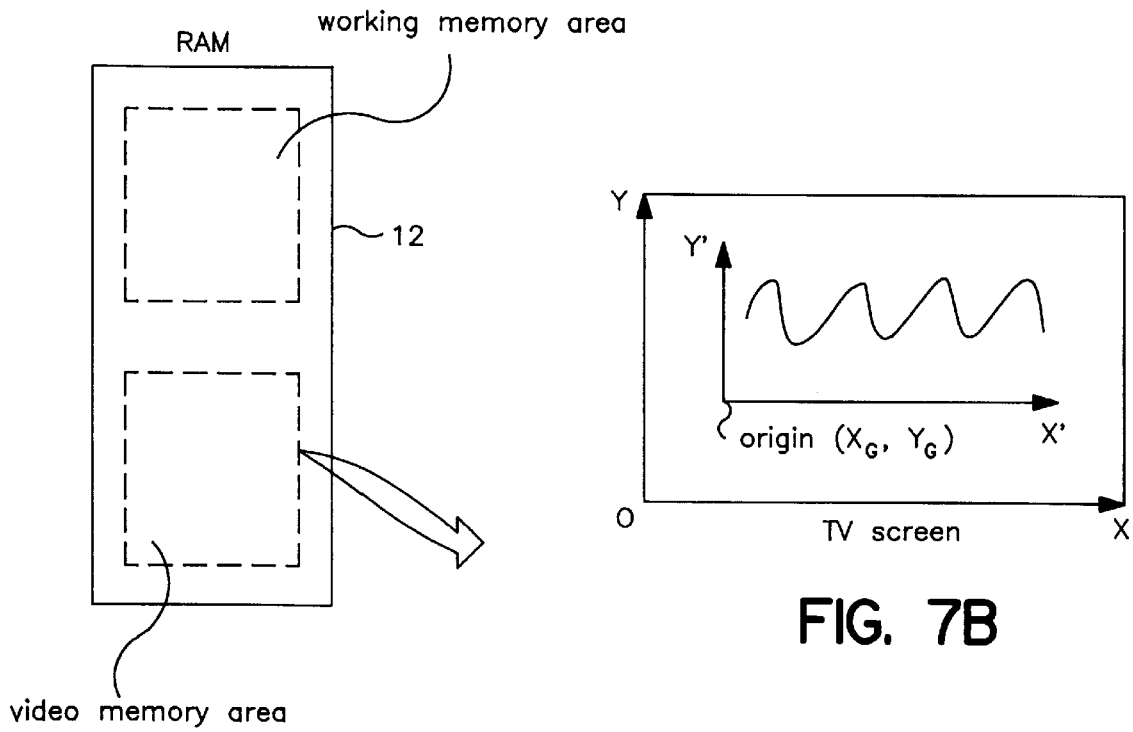
FIG. 7A
FIG. 7B
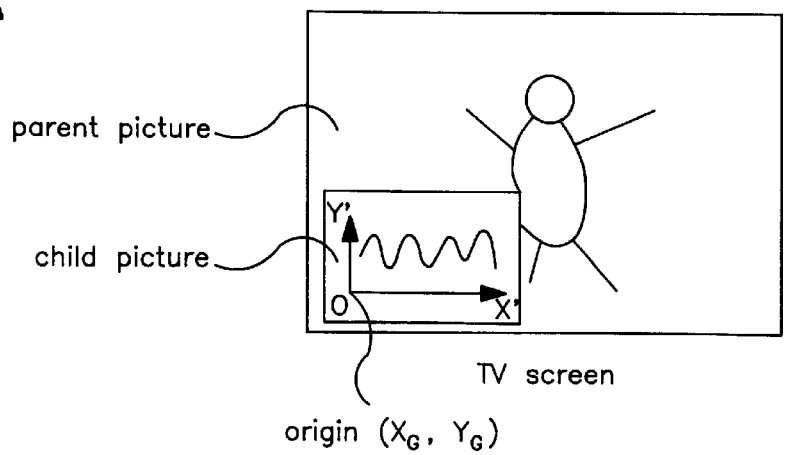
FIG. 7C

WAVEFORM DISPLAY SIGNAL GENERATING APPARATUS

BACKGROUND OF THE INVENTION

1. Field of the Invention

The present invention relates to a waveform display signal generating apparatus for converting a calculated result by providing digital data into a CPU (central processing unit), converting it into a television video signal and displaying it as a waveform on a screen of a television receiver which is being manufactured. Using this waveform display signal generating apparatus, a text signal or a PCM (pulse code modulation) sound signal can be conveniently observed on a television screen when television receivers for receiving a teletext multiplex signal or a PCM sound/multiplex signal are being manufactured.

2. Description of the Prior Art

In recent years, a digital signal processing circuit using a CPU as a core has been introduced in commercial electronic apparatuses. An example of a digital signal processing circuit using a basic CPU as a core in accordance with the prior art is shown in FIG. 1. The performance is described below, with reference to FIG. 1.

In FIG. 1, the symbol 1 is a video signal input terminal for inputting a television video signal. The block 2 is an A/D converter for converting a video signal inputted from into a video signal input terminal 1 into a digital data signal. The block 4 is a data processor for digitally signal processing the video signal digitized at A/D converter 2. The block 11 is a CPU for processing by calculation with a software program. The block 10 is a CPU interface circuit for making an interface between data processor 4 and CPU 11. The block 12 is a RAM (random access memory) having a working memory area for calculation of CPU 11 and a video memory area for storing bit-map data of a picture. The block 13 is a ROM (read only memory) for storing a software program. The block 6 is a D/A converter for converting a digital data signal from data processor 4 into an analog signal. The symbol 15 is a video signal output terminal for outputting an output video signal from D/A converter 6 as a television video signal.

When it is necessary to verify digitized data provided by the A/D converter 2 during the manufacturing of television receivers, data is verified by providing digital data to be verified into a computer or waveforms are verified on an oscilloscope by providing a D/A converter and converting the digital data to be verified into an analog signal.

In the above verification method, although verification is possible at a place where a verification system is ready according to the above verification method of digital data, it is difficult to respond when verification is required at a place where a verification system is not ready. This is a problem. In the case in which the A/D converter 2, the data processing circuit 4, the CPU interface circuit 10 and the D/A converter 6 are made into one LSI (large scale integration) integrated circuit in FIG. 1, because signals inside the LSI are verified, it becomes more difficult and a new verification system is required. This is another problem. The present invention aims to present a waveform display signal generating apparatus to solve the above problems.

SUMMARY OF THE INVENTION

To solve the problems, a waveform display signal generating apparatus of the present invention includes:

A/D converting means for converting an input analog video signal into a digital video signal;

data processing means for signal processing the digital video signal outputted from the A/D converting means;

calculating means for calculating the digital output of the A/D converting means and outputting a processed signal as a bit map data signal;

interface means connected to the A/D converting means and the data processing means and connected to the calculating means through a data bus;

first switching means for switching the output of the data processing means and the output of the calculating means and outputting the switched signal;

D/A converting means for converting the digital output of the first switching means into an analog signal;

video signal converting means for converting the output of the D/A converting means into a television video signal by adding a sync signal on the output of the D/A converting means; and second switching means for selecting the output of the video signal converting means if the output of the first switching means is an output of the calculating means and selecting the output of the D/A converting means if the output of the first switching means is an output of the data processing means and outputting the selected signal as a waveform display signal.

A waveform display signal generating apparatus in accordance with a first exemplary embodiment of the present invention is configured so that in digital data verification, digital data to be verified is supplied to a CPU, is verified by calculation with a software program at the CPU, then the data signal is converted into a graph signal for visualization. The graph signal is stored in a video memory area inside a RAM in the form of bit-map data, the bit-map data signal is converted into an analog signal at a D/A converter and then a sync signal is added at a television encoder to convert a television video signal and is displayed on a screen of a television receiver under production.

Thus, because the verification result can be displayed on a television screen, any particular verification system is not necessary at digital data verification.

A waveform display signal generating apparatus in accordance with a second exemplary embodiment of the present invention is configured so that, in digital data verification, digital data to be verified is supplied to a CPU, is verified by calculation with a software program at the CPU, then the data signal is converted into a graph signal for visualization. The graph signal is stored in a video memory area inside a RAM in the form of bit-map data, the bit-map data signal is colored at an LUT (color look up table) circuit, the colored data is converted into an analog signal and is displayed on a screen of a television receiver under production.

Thus, at digital data verification, because the verification result can be displayed on a television screen, any particular verification system is not necessary; and because the signal can be colored at an LUT circuit, the verification result is easy to see and is displayed in detail.

A waveform display signal generating apparatus in accordance with a third exemplary embodiment of the present invention is configured so that when a digital data verification is executed at a circuit for extracting and decoding digital data signals which are superimposed on a video signal and a sound signal, the verification result is converted into a television video signal to be displayed on a screen of a television receiver under production.

Thus, when a digital data verification is executed at a circuit for extracting and decoding digital data signals which are superimposed on a video signal and a sound signal, because the verification result can be displayed on a television screen, any particular verification system is not necessary and because the signal can be colored at an LUT circuit, the verification result is easy to see and is displayed in detail.

BRIEF DESCRIPTION OF THE DRAWINGS

FIG. 7(a) illustrates a memory area on a RAM.

FIG. 7(b) illustrates an example displaying only a waveform on a whole screen.

FIG. 7(c) illustrates an example displaying a waveform on a child picture area and a picture on a parent picture area, as a form of multi-picture display.

DETAILED DESCRIPTION OF THE INVENTION (First exemplary embodiment)

Figure 1:
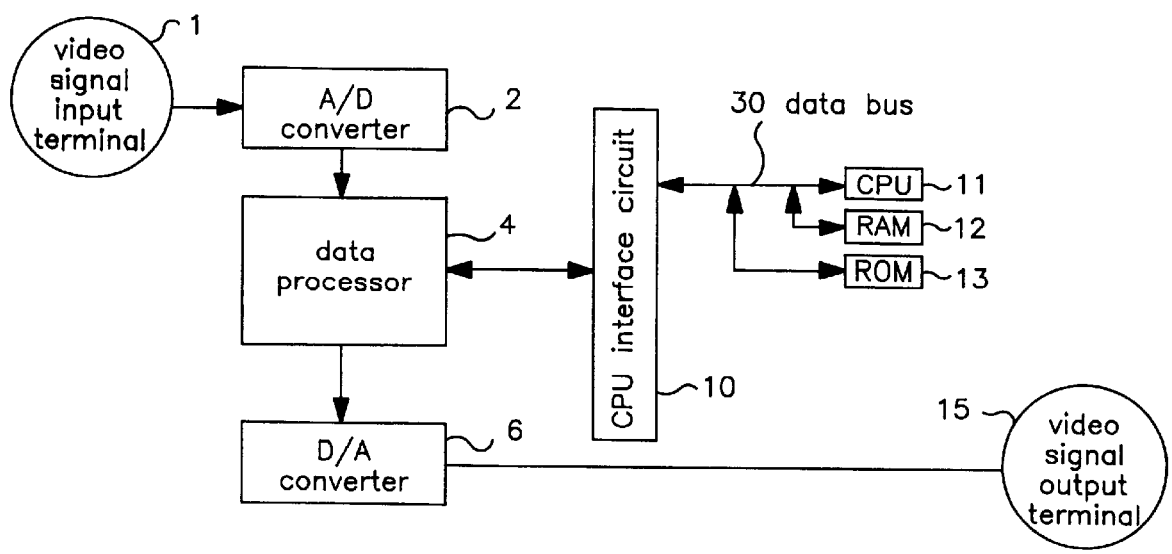
FIG. 1 is a block diagram of a waveform display signal generating apparatus in accordance with the prior art.
Figure 2:
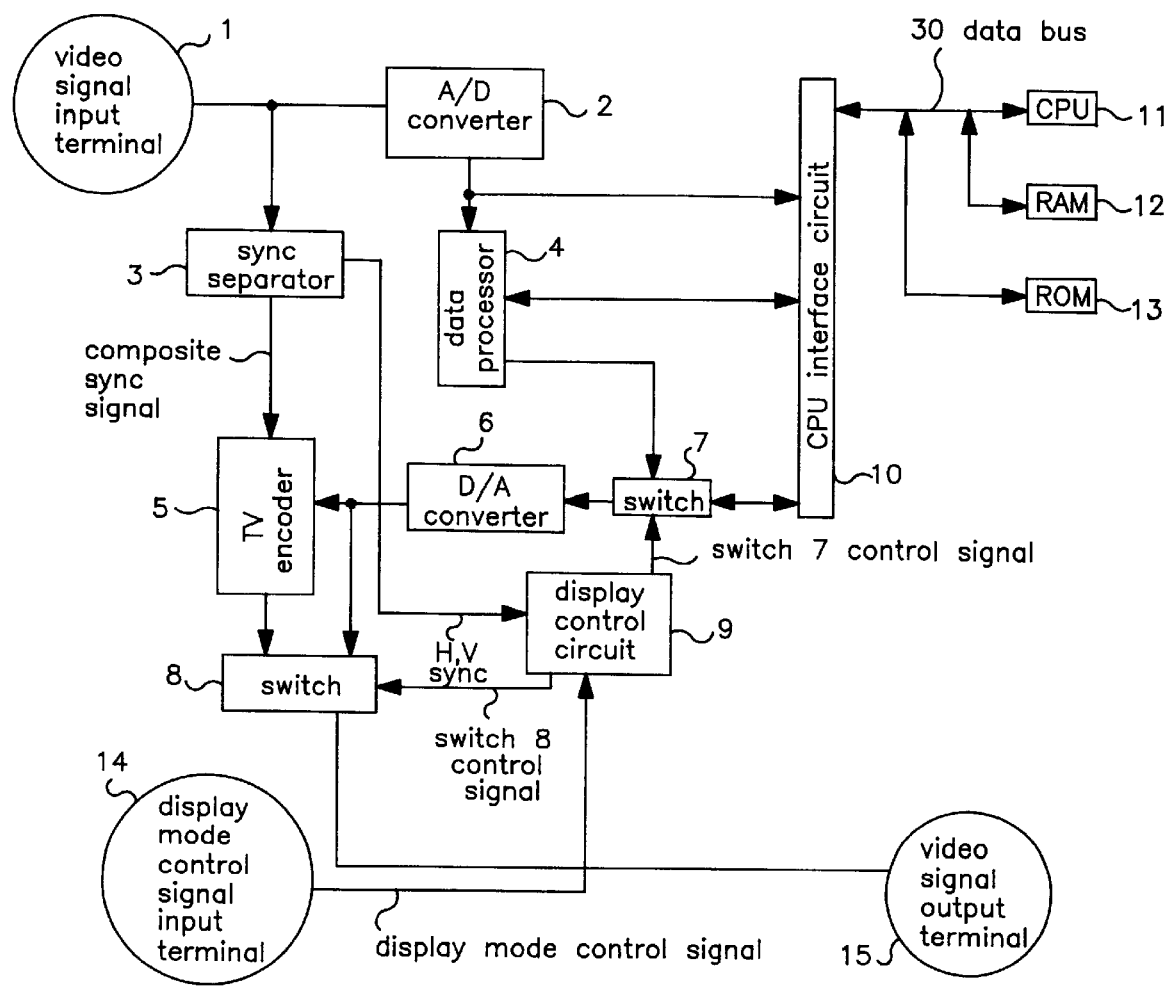
FIG. 2 is a block diagram of a waveform display signal generating apparatus in accordance with a first exemplary embodiment of the present invention.
Figure 6:
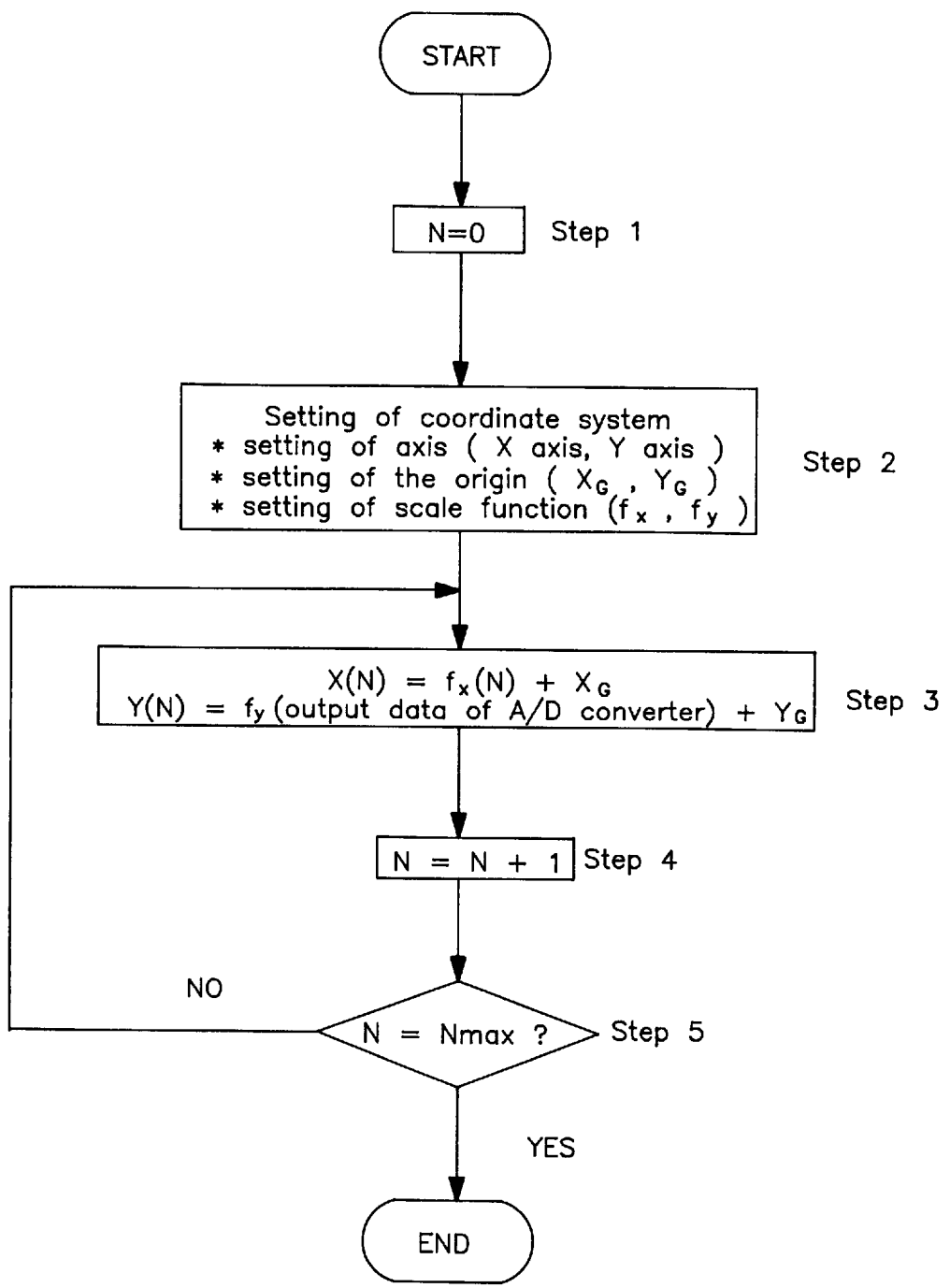
FIG. 6 is a flow chart for making waveform display data at a waveform display signal generating apparatus in accordance with the present invention.

A waveform display signal generating apparatus in accordance with a first exemplary embodiment of the present invention is explained below, referring to the drawings. FIG. 2 is a block diagram of a waveform display signal generating apparatus in accordance with a first exemplary embodiment of the present invention. FIG. 6 is a flow chart useful in describing the generation of display waveform data at a waveform display signal generating apparatus in accordance with the present invention. FIG. 7 illustrates a method to display a waveform on a screen of a television receiver being manufactured using a waveform display signal generating apparatus in accordance with the present invention.

In FIG. 2, the terminal 1 is a video signal input terminal for inputting a television video signal. The block 2 is an A/D converter for converting a video signal inputted from the video signal input terminal 1 into a digital data signal. The block 4 is a data processor for processing a video signal digitized at the A/D converter 2. The block 10 is a CPU (central processing unit) interface circuit which functions as an interface between each of the data processor 4, the A/D converter 2 and a switch 7 and a CPU 11 and is composed of, for example, a register circuit.

The block 11 is a CPU for processing by calculation with a software program. The block 12 is a RAM (random access memory) having a working memory area for the calculation of CPU 11 and a video memory area for storing bit-map data of a video signal. The block 13 is a ROM (read only memory) for storing the software program. The block 7 is a switch for switching a digital data output signal from the data processor 4 and a bit-map data signal from a video memory area of the RAM 12 according to a switch control signal from a display control circuit 9. The block 6 is a D/A converter for converting a digital output signal of the switch 7 into an analog signal. The block 3 is a sync separator for separating a sync signal from a video signal inputted from the video signal input terminal 1 and outputting H and V sync signals and a composite sync signal. The block 5 is a television encoder for encoding an output signal of the D/A converter 6 into a television video signal.

The symbol 14 is a display mode control signal input terminal for inputting a display mode control signal which selects a display mode of a signal outputted from a video signal output terminal 15 as a mode displaying only a waveform, a mode displaying only a picture or a mode displaying both a waveform and a picture. The block 9 is a display control circuit for controlling the switch 7 and the switch 8 by a switch 7 control signal and a switch 8 control signal, respectively generated according to a display mode control signal inputted from the display mode control signal input terminal 14. The block 8 is a switch for switching a video signal encoded at the television encoder 5 and an output signal of the D/A converter 6 according to a switch 8 control signal. The terminal 15 is a video signal output terminal for outputting a video output signal of the D/A converter 6 as a waveform display video signal.

The function of a waveform display signal generating apparatus configured like the above is explained below. A video signal inputted from the video signal input terminal 1 is converted into a digital signal at the A/D converter 2, processed at the data processor 4 and inputted to the switch 7. The CPU interface circuit 10 functions as an interface between the CPU 11 and the data processor 4, A/D converter 2 and switch 7.

For example, in the case of verifying the A/D converter 2, the output signal of the A/D converter 2 is inputted to the CPU 11 through the CPU interface circuit 10 and the data bus 30 and the signal is processed at the CPU 11 as shown in a flow chart of FIG. 6. The databus 30 transmits an address signal, a data signal, a write/read signal, a chip select signal, a CPU clock signal, a RAM control signal, etc.

The function is explained below, referring to FIGS. 6 and 7(a)–7(c). As shown in FIG. 7(a), RAM 12 has a video memory area corresponding to a television picture. For simplicity, the video memory area is expressed by the X-axis horizontally and the Y-axis vertically and coordinates (X',Y') are set on the video memory area. Defining the origin as (Xg,Yg), a scale function on the X-axis is fx and a scale function on the Y-axis is fy. Then, data X(N) and Y(N) to make a graph are made after setting coordinates as shown in a flow chart of FIG. 6.

FIGS. 7(b) and 7(c) respectively illustrate an example displaying only a waveform on a screen and an example displaying a waveform on a child picture area and an ordinary picture on a parent picture area, as a form of multi-picture display.

The data calculated at CPU 11 is stored as bit-map data in a video memory area of RAM 12. The bit-map data is inputted to switch 7 through CPU interface circuit 10. Switch 7 selects the output signal of data processor 4 and a bit map data signal according to a display mode control signal inputted from display mode control signal input terminal 14. The output signal of switch 7 is converted into an analog signal at D/A converter 6. Switch 8 selects the output signal of television encoder 5 when the output signal of switch 7 is a bit-map signal and selects the output signal of D/A converter 6 when the output signal of switch 7 is a data signal outputted from data processor 4, according to a switch control signal provided by the display control circuit 9.

The selected signal is outputted from video signal output terminal 15 as a waveform display video signal.

Therefore, in the first exemplary embodiment of the present invention, because a graphic data signal made by calculating and processing at CPU 11 is outputted as a television video signal, digital data verification can be done on a screen of the television receiver under production and any particular verification system is unnecessary.

(Second exemplary embodiment)

Figure 3:
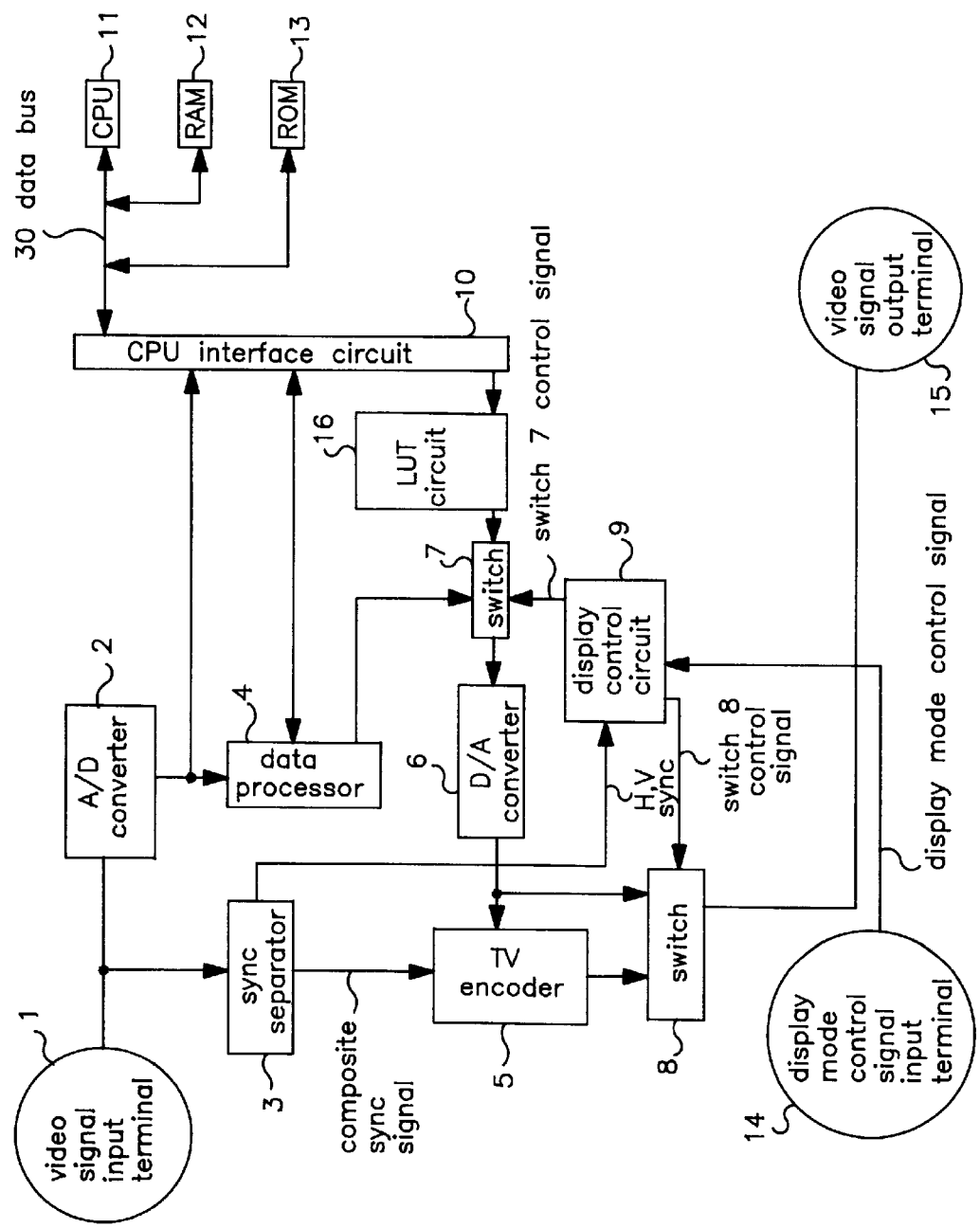
FIG. 3 is a block diagram of a waveform display signal generating apparatus in accordance with a second exemplary embodiment of the present invention.

FIG. 3 is a block diagram of a waveform display signal generating apparatus in accordance with a second exemplary embodiment of the present invention. In FIG. 3, the terminal 1 is a video signal input terminal for inputting a television video signal. The block 2 is an A/D converter for converting a video signal inputted from video signal input terminal 1 into a digital signal. The block 4 is a data processor for processing a video signal digitized at A/D converter 2. The block 10 is a CPU interface circuit which functions as an interface between a CPU 11 and each of the data processor 4, A/D converter 2 and a switch 7 and is composed of, for example, a register circuit.

The block 11 is a CPU for processing by calculation with software. The block 12 is a RAM having a working memory area for the calculation of CPU 11 and a video memory area for storing bit-map data of a video signal. The block 13 is a ROM for storing software. The block 16 is a LUT (look up table) circuit to color convert bit-map data from a video memory area of RAM 12. The block 7 is a switch for switching a bit-map data signal color converted at LUT circuit 16 and a signal processed digital video data signal from data processor 4 according to a switch 7 control signal from display control circuit 9. The block 6 is a D/A converter for converting an output signal of switch 7 into an analog signal. The block 3 is a sync separator for separating a sync signal from a video signal inputted from video signal input, terminal 1 and for outputting H and V sync signals and a composite sync signal.

The block 5 is a television encoder for encoding an output signal of D/A converter 6 into a television video signal. The block 14 is a display mode control signal input terminal for inputting a display mode control signal. The block 9 is a display control circuit for controlling switch 7 and switch 8 by a switch 7 control signal and a switch 8 control signal, respectively generated, according to a display mode control signal inputted from display mode control signal input terminal 14. The block 8 is a switch for switching a video signal encoded at television encoder 5 and an output signal of D/A converter 6 according to a switch 8 control signal. The terminal 15 is a video signal output terminal for outputting a video output signal of D/A converter 6 as a waveform display video signal. The function of a waveform display signal generating apparatus configured like the above is explained below.

A video signal inputted from video signal input terminal 1 is converted into a digital signal at A/D converter 2, processed at data processor 4 and inputted to switch 7. The CPU interface circuit 10 functions as an interface between CPU 11 and each of the data processor 4, A/D converter 2 and switch 7.

For example, in the case of verifying A/D converter 2, the output signal of A/D converter 2 is inputted to CPU 11 through CPU interface circuit 10 and data bus 30 and the signal is processed at CPU 11 as shown in the flow chart of FIG. 6.

Step 1: The procedure starts from N=0, where N is the number of data at the graph display.

Step 2: A video memory area for displaying a graph is preliminarily ready in RAM 12 and (X,Y) coordinates are assigned in the memory area, as shown in FIG. 7. Then, on the (X,Y) coordinate system, coordinates (X',Y'), which actually draw a graph, and an origin (Xg, Yg) are determined.

Using scale functions fx and fy to determine the scales for displaying a graph, a scale (size) of the graph is controlled.

In (X',Y') coordinates, a numerical value indicating that the order of the data to be displayed is fixed as X' and a data value to be displayed is fixed as Y'. Therefore, X and Y in (X,Y) coordinates become as follows.

$X(N)=fx(N)+Xg$ $Y(N)=fy$(data to be displayed)$+Yg$

Step 3: The above X(N) and Y(N) values are plotted on the video memory area.

Step 4: Like the above, the value N is increased one by one until it reaches a predetermined value, Nmax. The plotting ends when N=Nmax.

In the first and second exemplary embodiments, the data to be displayed are A/D converted data and in a third exemplary embodiment, as for data in a teletext broadcast, data to be displayed are data before and after the processing of transversal filtering and error correction at a data processor.

The data calculated at CPU 11 is stored in a video memory area of RAM 12 as a form of bit-map data. The bit-map data signal is inputted to and colored at the LUT circuit 16 through CPU interface circuit 10 and then it is inputted to switch 7. Switch 7 switches the two input signals, the output signal of data processor 4 and the colored bit-map data signal according to the display mode control signal inputted from display mode control signal input terminal 14 and the output signal of switch 7 is converted into an analog signal at D/A converter 6. Switch 8 selects the output signal of television encoder 5 when the output signal of switch 7 is a colored bit-map data signal and the output signal of D/A converter 6 when the output signal of switch 7 is an output of data processor 4, according to a switch 8 control signal from display control circuit 9. The output signal of switch 8 is outputted from video signal output terminal 15.

Therefore, in the second exemplary embodiment of the present invention, because a graphic data signal made by calculating and processing at CPU 11 is outputted as a television video signal, digital data verification can be done on a screen of the television receiver under production and any particular verification system is unnecessary. Moreover, because the display can be colored by an LUT circuit, the verification result becomes easy to see and a more detailed verification result can be displayed.

(Third exemplary embodiment)

Figure 4:
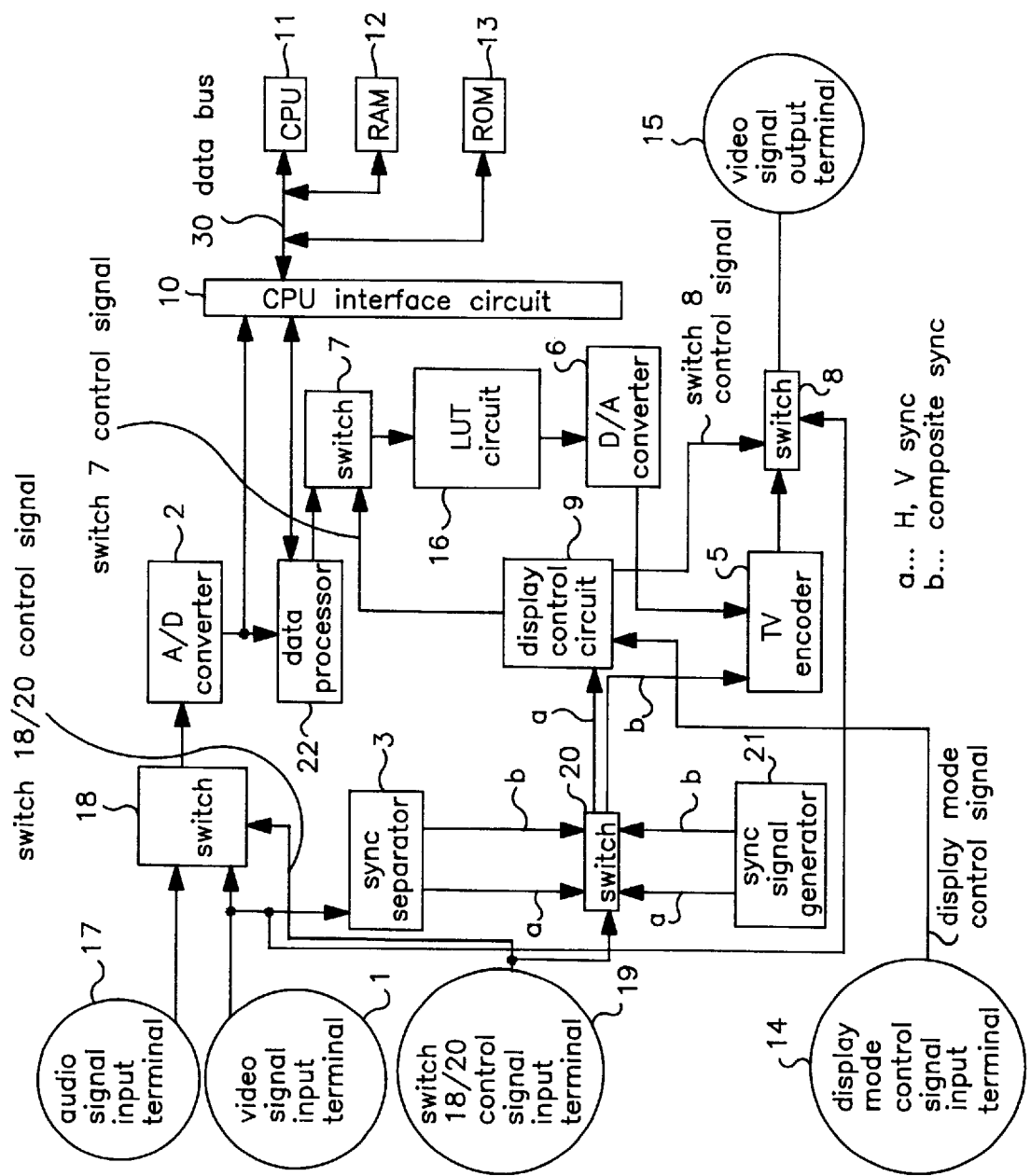
FIG. 4 is a block diagram of a waveform display signal generating apparatus in accordance with a third exemplary embodiment of the present invention.

FIG. 4 is a block diagram of a waveform display signal generating apparatus in accordance with a third exemplary embodiment of the present invention. In FIG. 4, the symbol 1 is a video signal input terminal for inputting a video signal superimposed with a digital data signal. The symbol 17 is an audio signal input terminal for inputting an audio signal superimposed with a digital data signal, for example, in the case of receiving an FM teletext multiplex broadcast or data transmission using PCM sound signals. The symbol 19 is a switch 18/20 control signal input terminal for controlling switches 18 and 20. The block 18 is a switch for switching a video signal inputted from video signal input terminal 1 and an audio signal inputted from audio signal input terminal 17 according to a switch 18/20 control signal. The block 2 is an A/D converter for converting an output signal of switch 18 into a digital data signal. The block 22 is a data processor for extracting and decoding a digital data superimposed on the signal from the signal digitized at A/D converter 2.

The block 10 is a CPU interface circuit for functioning as an interface between a CPU 11 and each of the data processing circuit 22, A/D converter 2 and a switch 7 and is composed of, for example, a register circuit. The block 11 is a CPU for processing by calculation with software. The block 12 is a RAM having a working memory area for the calculation of CPU 11 and a video memory area for storing bit-map data of a video signal. The block 13 is a ROM for storing the software.

The block 7 is a switch for switching a bit map data signal from a video memory area of RAM 12 and a digital data signal extracted and decoded from the output signal of A/D converter 2 at data processor 22, according to a switch 7 control signal from display control circuit 9. The block 16 is an LUT circuit for color converting a bit-map data signal from a video memory area of RAM 12. The block 6 is a D/A converter for converting an output signal of LUT circuit 16 into an analog signal. The block 3 is a sync separator for separating a sync signal from a video signal inputted from video signal input terminal 1 and outputting H and V sync signals and a composite sync signal. The block 21 is a sync generator for generating H and V sync signals and a composite sync signal which are used for display as a picture by decoding digital data superimposed on an audio signal.

The block 20 is a switch for switching a pair of H and V sync signals and a composite sync signal from sync separator 3 and a pair of H and V sync signals and a composite sync signal from sync generator 21 according to a switch 18/20 control signal. The block 5 is a television encoder for encoding an output signal of the D/A converter 6 into a television video signal. The block 9 is a display control circuit for controlling switch 7 and switch 8 by a switch 7 control signal and a switch 8 control signal, respectively, both of which are generated at a display control circuit according to a display mode control signal inputted from display mode control signal input terminal 14. The block 8 is a switch for switching a video signal encoded at television encoder 5 and a video signal inputted from video signal input terminal 1 according to a switch 8 control signal from display control circuit 9. The symbol 15 is a video signal output terminal for outputting an output signal of switch 8 as a waveform display video signal.

The function of a waveform display signal generating apparatus configured like the above is explained below.

Switch 18 switches a video signal inputted from video signal input terminal 1 and an audio signal inputted from audio signal input terminal 17 according to a switch 18/20 control signal inputted from switch 18/20 control signal input terminal 19. Switch 20 switches a pair of H and V sync signals and a composite signal separated at sync separator 3 and a pair of H and V sync signals and a composite signal generated at sync generator 21 according to a switch 18/20 control signal.

Thus, a verification result of digital data superimposed on an audio signal can be outputted from video signal output terminal 15 as a television video signal even for an input signal without a sync signal such as an audio signal.

Figure 5:
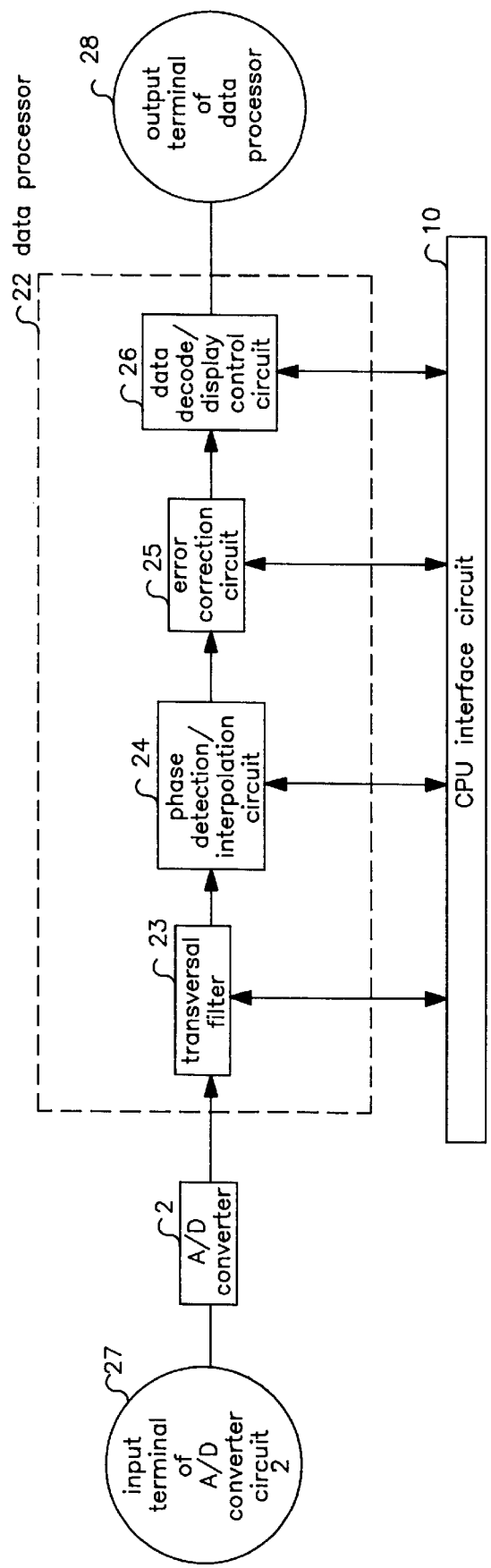
FIG. 5 is a block diagram of a data processor of a waveform display signal generating apparatus in accordance with the third exemplary embodiment of the present invention.

FIG. 5 is an example of a block diagram of a data processing circuit 22 used for extracting and decoding teletext multiplex signal superimposed on a video signal and its function is explained below, with reference to FIG. 5.

In FIG. 5, a signal outputted from an output terminal 28 of switch 18 is converted into a digital signal at A/D converter 2 and the digital signal is inputted to data processor 22. In data processor 22, a ghost signal is removed from the input signal at a transversal filter 23, phase detection and interpolation processing are executed at a phase detection and interpolation circuit 24 and text data is extracted. The extracted text data is error corrected at an error correction circuit 25. The text data is then executed with data extraction and decoding processing by display controlling for decoding processing and displaying on the television picture text data at a data decode/display control circuit 26.

For example, when verifying decoded data of a text multiplex broadcast, the data before and after signal processing at transversal filter 23 and the data before and after error correction are outputted and inputted to CPU 11 through CPU interface circuit 10 and CPU bus 30. Calculation processing shown in FIG. 6 is executed at CPU 11. The data calculated at CPU 11 is stored in a video memory area of RAM 12 as a form of bit-map data. The bit-map data is inputted and colored at an LUT circuit 16, converted into an analog signal at D/A converter 6, encoded into a television video signal at television encoder 5 and then outputted from video signal output terminal 15 as a waveform display video signal. Verification of A/D converter 2, transversal filter 23, phase detection/interpolation circuit 24, error correction circuit 25 and data decode/display control circuit 26 can be done on a television screen by displaying the waveforms before and after signal processing at the transversal filter and the waveforms before and after error correction on a television screen in a form of a graph.

Therefore, in the third exemplary embodiment of the present invention, when verifying the digital data at a circuit for extracting and decoding the digital data superimposed on a video signal and an audio signal, because the verification result can be displayed on a screen of the television receiver under production, any particular verification system is unnecessary. Moreover, because the display can be colored by an LUT circuit, the verification result becomes easy to see and a more detailed verification result can be displayed.

In a waveform display signal generating apparatus in accordance with the first exemplary embodiment of the present invention, because the verification result can be displayed on a television screen, any particular verification system is unnecessary at a digital data verification.

In a waveform display signal generating apparatus in accordance with the second exemplary embodiment of the present invention, because the verification result can be displayed on a television screen, any particular verification system is unnecessary at a digital data verification. Further, because a graph can be colored by an LUT circuit, the verification result is not only easy to see but can be displayed in detail.

In a waveform display signal generating apparatus in accordance with the third exemplary embodiment of the present invention, in the case in which a digital data verification at an extracting and decoding circuit of a digital data signal superimposed on a video signal and an audio signal is executed on a television screen, the verification result can be converted into a television video signal and can be displayed on a television screen by generating a sync signal at a sync separator for a video signal and an audio signal at a sync generator and can be displayed on a television screen.

By comprising the circuits used in the present invention in an LSI integrated circuit comprising a CPU interface circuit, an A/D converter, a memory, a logic circuit, etc., verification of the A/D converter, the memory, the logic circuit, etc. in the LSI integrated circuit can be done and LSIs as well as television receivers under production can be verified without requiring any particular verification system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A waveform display signal generating apparatus comprising:

A/D converting means for converting an input analog video signal into a digital video signal;

data processing mean for signal processing the digital video signal outputted from said A/D converting means and providing a digital output signal;

calculating means for processing by calculation the digital output signal of said A/D converting means and outputting a processed signal as a bit-map data signal;

interface means connected to said A/D converting means and said data processing means and connected to said calculating means through a data bus;

first switching means for switching the digital output signal of said data processing means and the processed signal of said calculating means and outputting a switched signal;

D/A converting means for converting the switched signal into an analog signal;

video signal converting means for converting the analog signal provided by said D/A converting means into a television video signal by adding a sync signal to the analog signal; and second switching means for selecting the television video signal of said' video signal converting means if the switched signal of said first switching means is the processed signal of said calculating means and selecting the analog signal of said D/A converting means if the switched signal of said first switching means is the digital output of said data processing means and outputting the selected signal as a waveform display signal.

2. A waveform display signal generating apparatus as recited in claim 1 further comprising:

storing means for storing the bit-map data signal of said calculating means.

3. A waveform display signal generating apparatus as recited in claim 2, wherein:

said storing means has a video memory area for storing the bit-map data signal and a working memory area used for calculation processing at said calculating means.

4. A waveform display signal generating apparatus as recited in claim 1 further comprising:

sync separating means for separating an input sync signal from the input analog video signal; and display control means for outputting a switch control signal to control said first switching means and said second switching means by the output signal of said sync separating means and a display mode control signal provided by a display mode control signal input terminal for switching a display mode of a display signal.

5. A waveform display signal generating apparatus as recited in claim 1 further comprising:

read-only-memory (ROM) means connected to said calculating means through a further data bus, said read-only memory means storing software for calculation processing of said calculating means.

6. A waveform display signal generating apparatus comprising:

an A/D converter for converting an analog video signal inputted from a video signal input terminal into a digital data signal;

a data processor for signal processing the digital video signal outputted from said A/D converter;

a central processing unit (CPU) connected to a CPU interface circuit through a data bus and for processing by calculation;

a CPU interface circuit connected to said data processor and said A/D converter and for interfacing to said CPU;

a random-access-memory (RAM) connected to said CPU through said data bus and having a working memory area for calculation in said CPU and a video memory area for storing a bit-map data of a video signal;

a ROM connected to said CPU for storing software;

a sync separator for separating a sync signal from the analog video signal inputted from said video signal input terminal and outputting H and V sync signals and a composite sync signal;

a display control circuit for outputting a control signal according to a display mode control signal inputted from a display mode control signal input terminal and the H and V sync signals outputted from said sync separator;

a first switch for switching an output of said CPU interface circuit and an output signal of said data processor according to the control signal from said display control circuit and outputting a first switched signal;

a D/A converter for converting the first switched signal of said first switch into an analog signal;

a television encoder for converting the analog signal outputted from said D/A converter and the composite sync signal outputted from said sync separator into a television video signal; and a second switch for switching the video signal encoded at said television encoder and the analog signal provided by said D/A converter responsive to the control signal from said display control circuit and outputting a second switched signal as a waveform display video signal.

7. A waveform display signal generating apparatus comprising:

an A/D converter for converting an analog video signal inputted from a video signal input terminal into a digital video signal;

a data processor for signal processing the digital video signal outputted from said A/D converter;

a CPU connected to a CPU interface circuit through a data bus and for processing by calculation;

a CPU interface circuit connected to said data processor and said A/D converter and for interfacing to said CPU;

a RAM connected to said CPU through said data bus and having a working memory area for calculation in said CPU and a video memory area for storing a bit-map data of a video signal;

a ROM connected to said CPU through said data bus for storing software;

a color conversion circuit for color converting the bit-map data outputted from said CPU interface circuit;

a sync separator for separating a sync signal from the analog video signal inputted from said video signal input terminal and outputting H and V sync signals and a composite sync signal;

a display control circuit for outputting a control signal according to a display mode control signal inputted from a display mode control signal input terminal and the H and V sync signals outputted from said sync separator;

a first switch for switching an output of said color conversion circuit and an output of said data processor according to the control signal from said display control circuit and outputting a first switched signal;

a D/A converter for converting the first switched signal of said first switch into an analog signal;

a television encoder for converting the analog signal provided from said D/A converter and the composite sync signal outputted from said sync separator into a television video signal; and a second switch for switching the video signal encoded at said television encoder and the analog signal provided by said D/A converter responsive to the control signal from said display control circuit and outputting a second switched signal as a waveform display video signal.

* * * * *

UNITED STATES PATENT AND TRADE MARK OFFICE
CERTIFICATE OF CORRECTION

PATENT NO.   : 5,828,358
DATED        : October 27, 1998
INVENTOR(S)  : Monta et al.

It is certified that error appears in the above-identified patent and that said Letters Patent is hereby corrected as shown below:

Cover page, item [56] References Cited, U.S. Patent Documents, "5,559,530 9/1996 Yamashita et al." should be --5,559,530 6/1993 Yamashita et al.--.

Column 9, line 15, "mean" should be --means--.

Signed and Sealed this

Sixth Day of July, 1999

Attest:

Q. TODD DICKINSON

*Attesting Officer*  Acting Commissioner of Patents and Trademarks